United States Patent

Roser

[11] 3,923,657
[45] Dec. 2, 1975

[54] COMBINED SEPTIC TANK INLET PIPE SIGHT GLASS END PLUG AND TANK AERATOR SYSTEM

[76] Inventor: Kenneth F. Roser, River Rd., Marcy, N.Y. 13403

[22] Filed: Dec. 31, 1974

[21] Appl. No.: 537,744

[52] U.S. Cl. ............... 210/95; 210/170; 210/207; 210/220; 210/532 S; 261/122
[51] Int. Cl.² ................... C02C 1/12; B01F 3/04
[58] Field of Search ......... 210/15, 63, 95, 170, 207, 210/220, 532 S; 261/121 R, 122; 350/319

[56] References Cited
UNITED STATES PATENTS

| | | | |
|---|---|---|---|
| 1,224,483 | 5/1917 | Megill | 210/95 |
| 3,195,727 | 7/1965 | Kibbee | 210/221 R X |
| 3,672,749 | 6/1972 | Roser | 350/319 |
| 3,770,624 | 11/1973 | McKibben et al. | 210/221 R X |

*Primary Examiner*—Thomas G. Wyse
*Assistant Examiner*—Robert H. Spitzer
*Attorney, Agent, or Firm*—Sughrue, Rothwell, Mion, Zinn & Macpeak

[57] ABSTRACT

A cylindrical sight glass housing is threaded to the end of the horizontal septic tank inlet pipe within a building basement which pipe extends through a vertical basement wall and terminates within an in-ground septic tank. A port within the cylindrical housing permits water under pressure to impinge against the glass window to clean the window and flush inlet pipe to the septic tank. A thin tube air conduit projects through the cylindrical housing and has attached thereto a coiled flexible plastic pipe which terminates in a porous aeration element. A conical piston is fixed to the aeration element and a vibrating air pump supplies air to the coiled flexible pipe and aeration element. The flow of sewage through the inlet pipe or the water under pressure in cleaning the sight glass drives the piston through the length of the pipe and into the septic tank where the air escaping from the porous aeration element provides aerobic action to the sewage within the tank and to the leach field downstream thereof.

8 Claims, 3 Drawing Figures

3,923,657

COMBINED SEPTIC TANK INLET PIPE SIGHT GLASS END PLUG AND TANK AERATOR SYSTEM

BACKGROUND OF THE INVENTION

1. Field of the Invention

This invention relates to sight glasses for threaded fitting to the basement end of the septic tank sewage inlet pipe which extends from the building basement through the basement wall to the septic tank, and more particularly to a sight glass assembly which includes an arrangement for effecting aerobic action on the sewage within the septic tank itself.

2. Description of the Prior Art

U.S. Pat. No. 3,672,749, to this applicant, discloses a sight glass for viewing the interior of sewage pipes and the like and for cleaning of the pipe to remove internal obstructions resulting from flow blockage. The ability to pinpoint the location of such obstruction permits immediate correction without the necessity of removing and substituting large sections of pipe and results in the considerable saving in time and money. The sight glass of the patent incorporates a valve controlled inlet allowing a pressurized fluid such as water to impinge against the glass and the plug housing interior at a double inclination to insure vortex cleaning of both the glass and the pipe and the removal of the block, while facilitating the viewing of the unblocked pipe. Such sight glasses have been employed in building installations where the sewage pipe which is essentially at eye level within the basement of the building extends horizontally through the basement sidewall and permits the building waste which runs vertically from the upper floor and extends into the basement, to pass accumulated waste such as sewage, water and the like, horizontally to a point exterior of the building for treatment by conventional septic systems. Such systems normally incorporate a large septic tank which initially stores the liquid waste slurry which constitutes suspended solids within the waste liquid and permits the liquid to flow over baffles at the upper end of the tank to an outlet at essentially the same level as the inlet but on the opposite side thereof for liquid dispersion through a leach field downstream of the setpic tank. While the sight glass facilitates the cleaning of the horizontal inlet pipe from the building basement to the underground septic tank and permits the viewing of the condition of the pipe interior, septic systems by their very nature have a limited life span, depending upon the nature of the earth formation within which the tank rests and that of the leach field which receives the liquid effluent from the septic tank, disperses the liquid content and permits the gaseous matter to pass upwardly through the overlying earth and to escape at the earth's surface to the atmosphere. Septic tanks constitute essentially anaerobic treatment of sewage, that is, sewage is acted upon by bacteria in the absence of air or oxygen, both within the septic tank itself and within the leach field. The septic tank which initially receives the built in waste particularly where the septic tank is used to treat the waste from residential homes and the like, has grease and oil accumulating at the top of the liquid mass within the tank in a mass of sludge which is not subject to breakdown by the bacteria within the tank. Periodically, the accumulated sludge, floating on the surface of the liquid body, the liquid itself and the deposited solids must be removed from the tank or back-up of waste into the basement may occur through the horizontal inlet pipe leading from the basement to the septic tank. Further, movement of the grease and oil and like material over the baffles and into the leach field results in clogging of the pores of the leach field and the prevention of the leach field from acting properly to diffuse the liquid effluent from the septic tank and further effect anaerobic action on the waste within the leach field.

It is, therefore, an object of the present invention to provide an improved sight glass which incorporates an assembly permitting the aeration of the septic tank contents and wherein the aeration means may be readily introduced into an existing septic tank system by way of the inlet pipe leading from the building basement to the underground septic tank.

It is a further object of the present invention to provide an improved sight glass and septic tank aeration system in which a determination may be readily made as to whether the aeration element has in fact been inserted within the in ground septic tank.

It is a further object of the present invention to provide a combined sight glass for a septic tank inlet pipe and a tank aeration system in which the sight glass lens and the pipe interior may be readily cleaned while at the same time the aeration carried by the sight glass may be forced from the vicinity of the sight glass through the pipe leading to the septic tank and into the septic tank by the cleaning action.

SUMMARY OF THE INVENTION

The present invention provides a sight glass in the form of a cylindrical plug which constitutes a threaded end fitting for the horizontal septic tank inlet pipe which leads from the waste pipe within the building basement through the vertical basement side wall to the upper end of an underground septic tank exterior of the building and spaced somewhat therefrom. Preferably, a valved port opens up into the interior of the cylindrical housing at an approximately 10° angle to a longtiduinal center plane passing through the housing and the port opening to effect a vortex cleansing action when a liquid such as water under pressure enters the port and impinges against the inner housing wall, the port also preferably being at an angle of approximately 10° from the plane of the sight glass lens plate which sealingly overlies the end of the plug. A small diameter air conduit or tube projects through the cylindrical housing and has one end of a coiled flexible hose fluid coupled to the end of the conduit interior of the housing, the other end of the hose being fluid coupled to a porous aeration ball, the coiled hose and the aeration ball initially rest within the septic tank inlet pipe. An air pump fluid coupled to the air conduit external of the sight glass cylindrical housing is selectively coupled to a source of electrical power. A piston carried by the aeration ball spans the inlet pipe interior and downstream of the waste line inlet and cleaning liquid port such that building sewage or liquid under pressure through the port when cleaning the septic tank inlet pipe forces the aeration ball and the coiled hose attached thereto to move horizontally through the septic tank inlet pipe for gravity deposit onto the bottom of the septic tank. Energization of the pump results in aeration of the liquid within the septic tank for aerobic sewage treatment within the septic tank, and to the leach field downstream of the same. The piston carrying the aeration ball may take the form of a conical paper parachute, attached to the aeration ball by one or more strings.

DESCRIPTION OF THE PREFERRED EMBODIMENT

Figure 1:
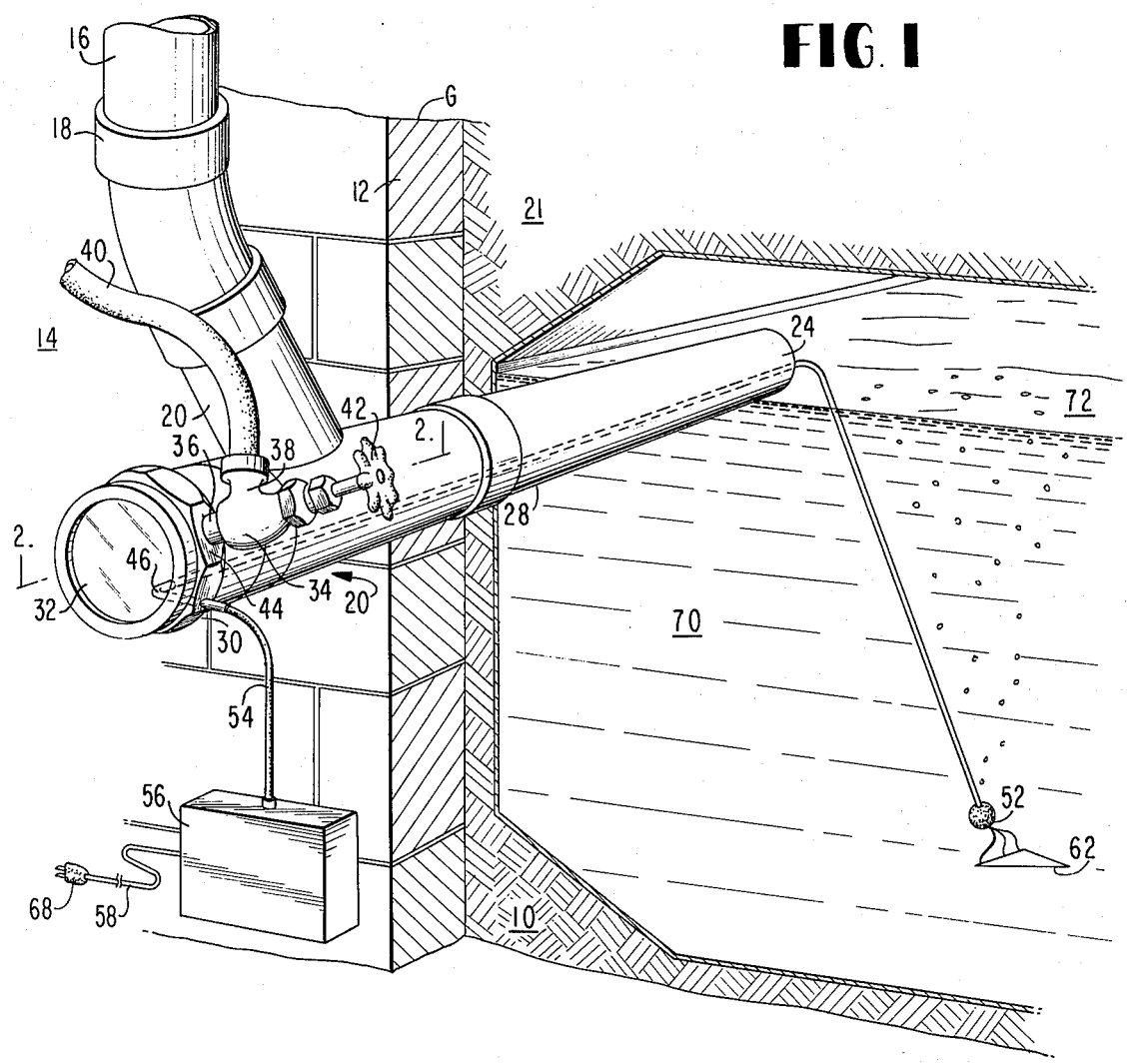
FIG. 1 is a perspective view of the combined septic tank inlet pipe sight glass and septic tank aeration system of the present invention in one form, as installed and in use.

Reference to the drawings shows, by way of example, a preferred arrangement of the combined septic tank inlet pipe sight glass and tank aeration system of the present invention. A septic tank indicated generally at 10 forms a part of an existing sewage treatment system for home use, in which the septic tank is positioned at some distance below the ground level G externally of a building, of which the basement sidewall 12 is shown. Sidewall 12 forms the basement 14 of the building. In conventional fashion, the house or like building is provided with a vertical waste pipeline 16 of relatively large diameter (not shown) which extends through the upper floor into the basement 14 and is coupled at its lower end 18 by way of an angled elbow 20 to a horizontal septic tank sewage inlet pipe 22 which penetrates the building basement sidewall 12, the earth formation 21 external to that wall and extends to the septic tank 10 where the discharge end 24 of the septic tank inlet pipe 22 opens up into the septic tank interior through one of the tank sidewalls at a point near the top of the tank.

This arrangement is conventional, and applicant's invention is directed to the sight glass assembly indicated generally at 20 which takes the form of a threaded end plug 30 for septic tank inlet pipe 22 which is threaded to that pipe in a conventional manner and in the manner of the referred to U.S. Pat. No. 3,672,749. In that respect, the sight glass end plug 30 takes the form of a hollow cylindrical housing formed of a material such as brass which is of a diameter corresponding to that of pipe 22 and which conforms in many respects to an imperforate end plug conventionally closing off an end of a threaded pipe such as 22 which may also be formed of brass. The end plug 30 may have a hexagonal or octagonal outer surface permitting a pipe wrench or the like to thread the plug 30 to the end of the septic tank inlet pipe 22 which protrudes into the basement 14 through wall 12. A clear plate glass lens 32 overlies the end of the plug 30 in identical fashion to the sight glass of U.S. Pat. No. 3,672,749. Further, a tapped and threaded opening or port 33 is provided within the side of the cylindrical housing 30, the port employing standard type threads on the inside surface thereof and the inside surface of the inlet pipe 22 for the septic tank 10. Preferably, a valve fitting 34 is provided, however, which includes a male threaded portion 36 received by the female threaded port of the cylindrical housing 30, while a second male threaded portion 38 acts as a connection to a water hose 40 which may be attached to a faucet (not shown) within the basement for ready application of water under pressure to effect the cleaning of the lens, the cylindrical housing of the sight glass assembly 20, and the septic tank inlet pipe 22. The hose 40 may be permanently attached and open to the water supply and the flow of water through the port may be controlled by rotation of the valve operating handle 42 for the valve fitting 34. Preferably, the port 33 is positioned at an angle of 10° with respect to the plane of the viewing glass surface in order to direct cleaning water against the internal surface of the plate glass lens 32, while further the same port lies at a 10° angle to a line normal to the hexagonal surface 44 from which it extends to effect the vortex cleaning action for cleaning the pipe interior in the manner of the aforementioned patent.

The present invention is highlighted by the employment of a septic tank aeration system which employs the sight glass plug assembly 20 as a means of introduction of aerobic treatment to the contents of the septic tank and which may permit the application of aerobic action to a septic system already in being. It is not necessary to install the system at the time that the septic tank is placed in the ground and the tank is fluid coupled by way of inlet pipe 22 to the building waste line 16. In this respect, in combination with the sight glass lens 32 and the valve fitting 34, the cylindrical housing is provided with a short, small diameter L-shaped metal tube 46 preferably formed of a short length of copper including a portion which extends through a radial bore within the cylindrical housing 30, the end of the tube interior of the cylindrical housing being sealably coupled to a length of flexible plastic hose or tubing 50 which is initially coiled and which terminates at its opposite end in an aeration element or ball 52. Ball 52 constitutes a porous element permitting the air to pass from its interior by way of flexible hose 50 to its surface for dissemination through the liquid contents of the septic tank and rise to the surface of the same. Preferably, the aeration element 52 takes the form of a composite stone and fiberglass ball which is full of pores or air passages of irregular form and which is readily bonded to the end of the plastic hose 50 so as to be physically supported by the hose. The end of the L-shaped copper tube 46 which protrudes outwardly of the end plug housing within the basement 14 is fluid coupled by way of conduit or tube 54 to an air pump 56 illustrated in rectangular block form and constitutes a conventional electrical vibrator operated diaphragm air pump. Electrical cord 58, attached to the electromagnetic vibrator motor (not shown), terminates in a conventional electrical plug 68 which fits into a wall socket (not shown) within the basement forming a source of electrical current. The air pump 56 is similar to that employed in supplying air to aquariums and the like and constitutes a source of a limited flow of air under slight pressure which is all that is needed for proper aerobic action within a small septic tank of the type associated with a single family house and provides sufficient air for further aerobic action within the leach field and final air diffusion from the leach field through the ground 21 to the ground surface G.

Since the combination sight glass and tank aerator of the present invention is preferably applicable to existing sewage treatment systems of the septic tank type, it is necessary, once the sight glass plug is attached to the end of the sewage tank inlet pipe leading from the basement to the tank within the basement, that the aeration member be suitably deployed into the tank so that the air seeping to the surface of the aeration ball may permeate the waste accumulating within the tank to effect the desired aerobic action. In this respect, the present invention either makes use of the natural flow of waste liquid from the waste line 16 into the tank inlet pipe 22 or the forced flow of water entering the valve fitting 34 which facilitates cleaning of the glass lens and cleaning out of the pipe for forcing the aeration ball to move from its initial position disposed within that portion of the inlet pipe lying within the basement to the discharge end 24 of the pipe 22 and thence into the septic tank for gravity deposit into the bottom of the septic tank. In this respect, by reference to FIGS. 2 and 3, it is seen that the plastic hose 50 is initially coiled into coils of a diameter smaller than the internal diameter of the inlet pipe 20, the number of coils, of course, depending upon the length of the hose 50. It is preferable to provide a length of hose sufficient to reach the bottom of both septic tanks from the access point of building basement 14. However, that length may vary from 20 feet to 80 or 90 feet, depending upon the distance that the septic tank 10 lies from the building wall 12. In order to insure that either gravity discharge of sewage from waste line 16 into the septic tank through inlet pipe 22 or water under pressure through valve fitting 34, achieves that action preferably a conical tapered piston 62 is attached by means of one or more strings 60 at its base 66 to the aeration element or ball 52 with the conical piston 62 being positioned downstream of the aeration ball and the coiled hose 50, and to the downstream side of the valve fitting 34 and preferably the point of intersection between the waste line elbow 20 and the horizontal septic tank inlet pipe 22. The conical piston 62 looks much like a parachute for the aeration ball 50 but its action is one wherein liquid under gravity pressure or positive pressure through valve fitting 34 impinging upon the interior of the paper cone 62 forces by piston action, the cone to move axially through the cylindrical pipe 20 until the aeration ball 52 is ejected from the discharge end 24 of the inlet pipe, whereupon the aeration ball 52 and a portion of the hose 50 by gravity falls downwardly through the liquid contents of the tank resting upon the tank bottom, whereupon aerobic action takes place subsequent to plugging of the electrical plug 68 into the basement wall socket and energization of the air pump 56.

Figure 2:
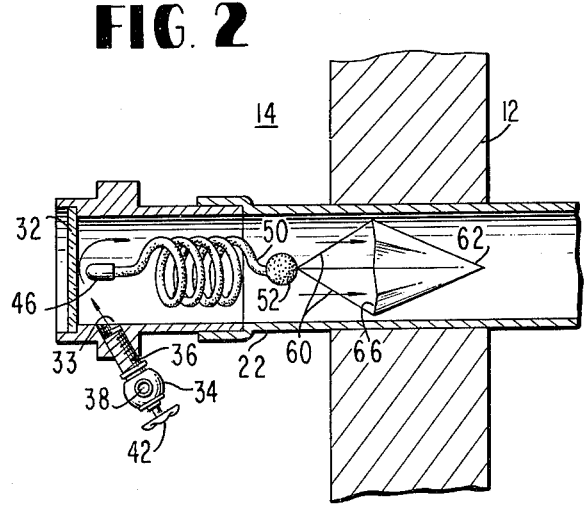
FIG. 2 is an enlarged sectional view of the portion of the septic tank inlet pipe within the building basement and the sight glass assembly with the aeration ball and coiled flexible plastic hose positioned within the septic tank inlet pipe at the time of initial liquid displacement of the aeration ball through the tank inlet pipe toward the septic tank.
Figure 3:
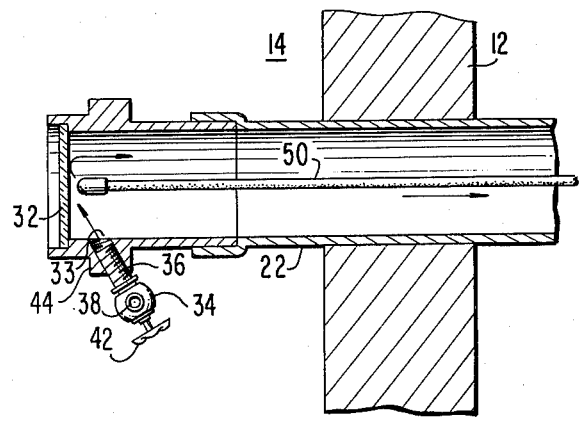
FIG. 3 is a similar enlarged sectional view of the portion of the septic tank inlet pipe of FIG. 2 after movement of the aeration ball away from the sight glass and into the septic tank.

FIG. 2 shows the aeration system element within the pipe 22 in position at the initiation of forced movement of the conical piston 62 through the length of the pipe 22 from left to right. FIG. 3 shows essentially the same view a moment later. By turning handle 42 of the valve fitting 34 and the introduction of water into the pipe interior, which acts to clean the glass lens plate 32, the end plug housing and pipe 22 interior by vortex action, axial shifting of the piston occurs as shown by the arrows which drags the aeration ball 52 and the attached hose 50 the length of the pipe 22.

It can be seen from the above that the sight glass of the reference patent has been combined with a septic tank aeration system consisting of a plut-in unit in terms of the electromagnetic air pump which pumps air under pressure through the small inlet conduit or tube 52 formed of plastic and may be identical to that of hose 50 and which leads to the inlet side of the L-shaped copper tube projecting through the cylindrical housing of the sight glass end plug 30. For normal application, the conduit or tube 54 leading from the air pump 56 to the L-shaped copper tube and the hose 50 may be quarter inch plastic pipe which is sufficiently flexible to permit the hose 50 to be coiled. Thus, in addition to the anaerobic action normally occurring within a septic tank, aerobic action is added, the air under pressure diffusing through the voids of the aeration ball 52 and rising to permeate the grease and oil normally forming a film 72 on top of the liquid 70 within the tank, which breaks the grease and oil down, causing an emulsion to be formed which flows over the baffle (not shown) to a discharge pipe (not shown) at the top of the tank but on the opposite side from inlet pipe 22, where it moves into laterally displaced leaching field. The emulsion leaches out into the leach field along with liquid with the air which slowly diffuses out to the surface of the ground, thus providing aerobic activity within the leach field itself. A definite advantage of such activity is to rejuvenate both the existing septic tank, causing the removal by aerobic action and break up of the accumulated material and at the same time opening up the clogged leach field pores to rejuvenate the leach field, thus increasing the life span of the existing septic system at minimum cost and providing improvement treatment to the sewage at the same time.

While the invention has been particularly shown and described with reference to a preferred embodiment thereof, it will be understood by those skilled in the art that various changes in form and details may be made therein without departing from the spirit and scope of the invention.

What is claimed is:

1. A combined end plug for a building septic tank inlet pipe and tank aerator comprises: a cylindrical end plug housing for sealed attachment to the building end of a horizontal septic tank inlet pipe leading from a building basement to the upper end of an underground septic tank exterior of the building and spaced therefrom, a port opening up into the interior of the cylindrical end plug housing at an angle to the longitudinal center plane passing through the housing and the port opening to effect a vortex cleansing action when liquid under pressure enters the port and impinges against the interior of the end plug housing, the improvement comprising:

a small diameter air tube projecting through said cylindrical housing, a coilable, flexible hose of a length in excess of said inlet pipe fluid coupled to the end of the air tube interior of the plug and terminating in an aeration member, and piston means operably coupled to said aeration member and spanning the interior of said inlet pipe at the time of initial installation of said end plug to said septic tank inlet pipe;

whereby, liquid under pressure passing through said inlet pipe upstream of said piston causes said piston, said aeration member and said coiled flexible hose to move axially through said inlet pipe to the extent that said aeration member and a portion of said flexible hose falls by gravity into said septic tank, whereby, subsequent application of air under pressure to the end of said air tube projecting exteriorly of said cylindrical housing, permits aeration of the septic tank content.

2. The end plug and aerator system as claimed in claim 1, further comprising an electromagnetic diaphragm pump fluid coupled to the end of said air tube exterior of said housing and means for energizing said pump to supply air to said aeration member subsequent to its disposition within said septic tank.

3. The end plug and aerator system as claimed in claim 2, wherein said aeration member comprises a fluid porous ball coupled to the end of said flexible hose.

4. The end plug and aerator system as claimed in claim 2, wherein said piston comprises a conical parachute having a base diameter on the order of the inner diameter of said inlet pipe and at least one string connecting said parachute at its base periphery to said aeration member.

5. The end plug and aerator system as claimed in claim 1, wherein said aeration member comprises a fluid porous ball coupled to the end of said flexible hose.

6. The end plug and aerator system as claimed in claim 5, wherein said piston comprises a conical parachute having a base diameter on the order of the inner diameter of said inlet pipe and at least one string connecting said parachute at its base periphery to said aeration member.

7. The end plug and aerator system as claimed in claim 5, wherein the end of said cylindrical housing comprises a glass plate sealingly overlying the same to permit the condition of the pipe interior and the location of said aeration member to be readily ascertained.

8. The end plug and aerator system as claimed in claim 1, wherein said piston comprises a conical parachute having a base diameter on the order of the inner diameter of said inlet pipe and at least one string connecting said parachute at its base periphery to said aeration member.

* * * * *